July 31, 1923.

G. E. CARTER

BOLT

Filed Oct. 17, 1919

1,463,572

Inventor;
George E. Carter

C. C. Shepherd Attorney

Patented July 31, 1923.

1,463,572

UNITED STATES PATENT OFFICE.

GEORGE E. CARTER, OF CIRCLEVILLE, OHIO.

BOLT.

Application filed October 17, 1919. Serial No. 331,258.

*To all whom it may concern:*

Be it known that GEORGE E. CARTER, a citizen of the United States, residing at Circleville, in the county of Pickaway and State of Ohio, has invented certain new and useful Improvements in Bolts, of which the following is a specification.

This invention relates broadly to bolts and other similar screw threaded fastening devices, and the underlying object of the invention resides in so constructing the shank of a bolt or a securing device in such manner that the application and securing of a castellated nut thereto may be accomplished in an expeditious and labor saving manner.

Another object of the invention resides in the provision of a bolt wherein the end of its shank is provided with a plurality of transversely extending openings, which are so positioned as to be capable of receiving a cotter pin or other device employed in the fastening of a castellated nut upon said shank, and in finally providing the extreme outer end of the latter with a longitudinally extending chamber so disposed as to intersect said pin receiving openings, the outer end of said chamber being open so that said openings may be clearly viewed and the operation of inserting the pin therethrough thus facilitated.

Figure 1:
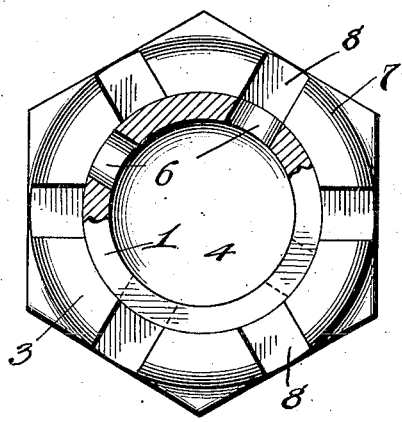
Figure 2:
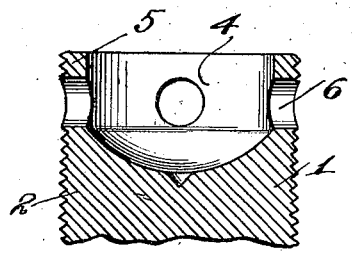
Figure 4:
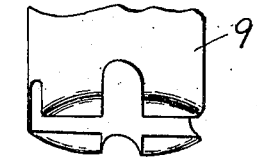
Figure 3:
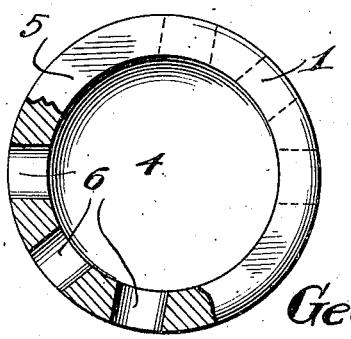

For a further understanding of the invention reference is to be had to the following description and to the accompanying drawing, in which similar characters of reference denote like and corresponding parts:

Figure 1 is an end view of a bolt constructed in accordance with the principles of the present invention and disclosing a castellated nut positioned thereon, Figure 2 is a fragmentary vertical sectional view taken through the shank end of a bolt formed in accordance with the principles of the present invention, Figure 3 is an end elevation of a modified form of bolt, and Figure 4 is an elevation of the supporting die which is utilized in bracing the bolt during the process of forming the pin receiving openings.

Hitherto, it has been the common practice in securing a castellated nut upon the threaded shank of a bolt to merely provide the latter with one or more pin receiving openings, which are so disposed as to pass transversely through said bolt and at positions appreciably spaced from the end of the bolt shank. By virtue of this construction a cotter pin or the like could be passed through the castellated slots formed in the nut and thence through at least one of the openings formed in the bolt, whereby a positive securing of the nut in position upon said bolt could be effected. However, the task of registering the slots of a castellated nut with the pin receiving opening formed in the bolt has always been a source of considerable difficulty, owing to the fact that the opening in the bolt is substantially concealed, and that the operator is therefore caused to continually adjust the nut back and forth until true registry has been obtained between the slots of the nut and the opening in the bolt. This task, obviously, has been one which has taken up considerable time and hence has been comparatively costly by reason of the time lost in effecting registry between the pin receiving portions of the nut and bolt. Accordingly, it is the main purpose of the present invention to construct a bolt so that an operator may instantly ascertain the correct position of a nut upon said bolt so that registration of pin receiving parts may be instantly and readily determined, thereby reducing the time required to lock a nut upon a bolt to a minimum.

With the above object, among others, in view, the present invention may consist of a bolt or other similar fastening device 1, which may be of any suitable or desired configuration or size and is provided with the usual nut receiving threaded shank 2, the latter being formed for the reception of a castellated nut 3. In the present instance, the extreme outer end of the shank is provided with a longitudinally extending chamber or chambered portion 4 whose axis is disposed in parallelism with the longitudinal axis of the shank. The chamber 4 may extend inwardly of said shank for any suitable or desired distance and by being concentrically situated within said shank will produce a relatively thin annular wall 5 upon the end of the bolt, and this wall is pierced by a plurality of pin receiving openings 6, which extend transversely through the shank 2 and the axis thereof are located substantially at right angles to the main longitudinal axis of the shank. It will be observed, upon reference to the drawing, that the outer end of said chamber is open, so that the interior of the chamber and the openings 6 may be clearly viewed from an exterior inspection. By the provision of the chamber 4 it will be apparent that the latter will intersect the opening 6 or the planes thereof.

From the foregoing, it will be apparent that a castellated nut 7 may be threaded upon the shank 2 in the ordinary manner. In large assembly plants this is mainly done by means of automatic machines. However, when it comes to the aligning of the slots 8 of the nut 7 with the openings 6, the operator will be enabled to locate the positions of the openings 6 by merely inspecting the latter through the chamber 4, and hence will be enabled to rotate the nut to the nearest of said openings in order that its slots 8 will register therewith. When this is done a cotter pin, securing key or other device may be driven through the registering slots 8 and the openings 6 and secured in the ordinary manner so as to prevent undue rotation of the nut 3 upon the bolt 1. It follows from the above that the locations of the openings 6 may be clearly and instantly ascertained by the provision of a chamber 4 and similarly, the relative positions of alignment which may exist between the slots 8 and the openings 6 may also be observed and governed. Hence, the main characteristic of the present invention resides in the provision of the sight chamber 4 in the end of a bolt which is so located as to intersect the pin receiving openings 6 and to enable the latter to be readily viewed and determined when the same are concealed by the positions which the nut 3 may occupy thereon. Therefore, the provision of said chamber will eliminate the necessity of the operator "feeling out" for the location of the holes or openings 6 and will eliminate the uncertainty of this operation by rendering the location of said holes or openings definite and readily observable. The bolts may be produced in large quantities on an automatic screw machine and the chambers 4 may be formed therein during their ordinary process of formation, hence, the provision of the chambers 4 will not involve an added operation in bolt manufacture thus enabling said bolts to be produced at prevailing costs. However, by reducing the material in the end of a shank so as to form the chamber 4, it is possible to punch the openings 6 therein, instead of drilling the same as has been necessary in the past, so that in reality the final cost of a bolt in which pin receiving openings are formed is capable of being reduced as regards present standards. However, I do not limit myself to this method of forming the opening 6, as it is obvious that the latter may be drilled or pressed out if it is so desired. Also, as many of the openings 6 may be employed in the wall 5 as is desired, in Figure 1 two sets are shown which provide twelve locking positions on the part of the nut 3, but in Figure 3 three sets of the openings 6 have been disclosed, which produce eighteen locking positions for said nut, as will be obvious. In Figure 3 the holes or openings are preferably forty degrees apart, as this has been found to be the most desirable arrangement when three sets of openings are employed. From the above it will be gathered that the present information provides a bolt to which a castellated nut may be quickly and conveniently applied and locked, and that through the provision of the sight chamber 4 advantages are to be had in the positioning of the nut in locking relationship with respect to the openings 6 and that facility is to be had in the formation of the openings 6 themselves. If desired, a recess die 9 may be inserted into the chamber 4 of the bolt prior to the operation of punching out the pin receiving openings 6, this die will have the desired effect of strengthening the relatively thin walls of the chamber 4 during the punching operations.

What I claim is:

As a new article of manufacture, a bolt including a threaded shank, said shank having its extreme outer end provided with a chamber extending longitudinally into said shank, said chamber being of sufficient size to produce a relatively thin circumferential wall upon the end of the bolt, and said wall having a plurality of radially disposed circumferentially spaced openings formed therein and in registration with each other, the axes of said openings being substantially at right angles to the longitudinal axis of the bolt.

In testimony whereof I affix my signature.

GEORGE E. CARTER.